United States Patent [19]

Charlton

[11] 3,950,643
[45] Apr. 13, 1976

[54] AUTOMATIC VOLUME COUNTING

[75] Inventor: John Cecil Charlton, Amersham, England

[73] Assignee: The Radiochemical Centre Ltd., Amersham, England

[22] Filed: Dec. 6, 1973

[21] Appl. No.: 422,200

[30] Foreign Application Priority Data
Dec. 18, 1972 United Kingdom............... 58417/72

[52] U.S. Cl. ............... 250/303; 250/328; 250/364; 424/1
[51] Int. Cl.²......................................... G01T 7/02
[58] Field of Search .......... 250/303, 328, 304, 364; 23/230 B; 424/1

[56] References Cited
UNITED STATES PATENTS

| | | | |
|---|---|---|---|
| 3,268,728 | 8/1966 | Stoddart et al. .................... | 250/303 |
| 3,597,611 | 8/1971 | Harman et al. ..................... | 250/303 |
| 3,614,434 | 10/1971 | Horwitz et al. ..................... | 250/364 |
| 3,728,084 | 4/1973 | Hulsen ............................ | 250/328 X |
| 3,788,812 | 1/1974 | Dupre ............................. | 250/303 X |
| 3,843,775 | 10/1974 | Wolf .............................. | 23/230 B X |

Primary Examiner—Archie R. Borchelt
Attorney, Agent, or Firm—Wenderoth, Lind & Ponack

[57] ABSTRACT

In order to measure the level of radioactivity of liquids in a set of vessels, e.g. those employed in a competitive radio-assay, liquid is drawn successively from each one of the set into a measuring region defined inter alia by radiation shielding, so as to fill the region, the measurement takes place in the region, and the liquid is thereafter expelled.

10 Claims, 2 Drawing Figures

AUTOMATIC VOLUME COUNTING

BACKGROUND OF THE INVENTION

This invention relates to analyses of the kind in which a radioactive element or compound is partitioned between two phases and the proportion of the activity in each phase determined. Typical of such analyses are competitive assays of the kind in which an unknown amount of the compound to be assayed and a standard amount of a radioactively-labelled version of the compound compete for reaction with a standard amount of another reagent. This technique is widely used in the medical field for assaying hormones and other substances, using as the other reagent the antibody in immune systems or some other specific reactor in non-immune or non-hormone systems.

The principle of the technique may be represented by the following scheme:

where
C is the compound to be assayed,
C* is the labelled version of the compound
R is the other reagent.

The amount of R is arranged to be insufficient to react with all of C + C*. As the reaction is, at least to some extent, reversible, an equilibrium is set up in which the ratio of [C*]/[C*]+[C*—R] is determined by the amount of the unlabelled compound C which is present. If C* is separated from C*—R and the level of activity of each separated part measured, then the value of the ratio is easily calculated. The amount of the unlabelled compound C can then be determined, in relative or absolute terms, by the use of standard preparation of compound C, to generate a calibration curve.

The technique is described, with examples, in a Review Paper by R. S. Yalow and S. A. Berson in IAEA-SM-124/106, pages 455–481.

Separation of C* from C*—R is generally effected in two stages. In the first stage, either C* or C*—R is caused to change phase for example by being precipitated from solution, or adsorbed on to an inert carrier, or passed into a water-immiscible phase. In the second stage, the two phases are removed from one another, e.g. by filtration, or more usually, by centrifuging followed by decanting the supernatant liquor. With the two phases separated into different vessels, it is a simple matter to determine the level of activity in each.

the separation of the two phases by removal of one from the reaction tube into another vessel is time-consuming and gives rise to inaccuracies. In particular, the transfer of material from one vessel to another is rarely complete.

An experiment is normally performed using a number of tubes, each containing the same amount of C* and R, of which tubes contain an unknown amount of the compound C to be assayed, while other tubes contain a known amount of the compound C and are used as standards to generate a calibration curve. The total volume of material in each tube used in an experiment is generally the same. In these circumstances another known procedure is sometimes used.

According to this known procedure, only a part of a liquid phase is withdrawn, e.g. by pipetting, from the reaction vessel, and an accurately measured volume thereof is placed in another vessel, and its level of radioactivity determined. The assumption is made that the accurately measured volume of liquid represents a constant proportion (as between different tubes in the same experiment) of the total volume of material. As before, the transfer of an accurately measured volume of radioactive liquid from one vessel to another is time-consuming and gives rise to inaccuracies.

SUMMARY OF THE INVENTION

In one aspect, the present invention provides a method of comparing the radioactive concentration of liquids in a set of vessels, which method comprises
a. drawing liquid from one of the set of vessels into a defined measuring region so that the liquid fills the said region,
b. measuring radiation emitted by the liquid in the region,
c. expelling the liquid from the region,
and repeating steps (a), (b) and (c) successively on the liquid in each of the set of vessels.

The measuring region is preferably defined by radiation shielding.

It will be understood from the introduction that the method of this invention is most likely to be performed as one step in an analysis, for example, a competitive radio-assay, involving several vessels each containing a radioactive element or compound partitioned between two phases, at least one of which is liquid. In the most usual case, the radiactive element or compound is partitioned between a liquid phase and a heavier solid phase, which may, if necessary, be concentrated at the bottom of the vessel by centifuging.

According to the present invention, and in contradiction to the known procedure described above, no measurement is made of the volume of the sample liquid whose level of radioactivity is determined. Instead, the volume of the sample is automatically determined by the volume of the defined measuring region which it fills. Furthermore, transfer of liquid from one vessel to another, e.g. via a pipette, is not involved, since, according to the present invention, the liquid can be withdrawn directly into the defined measuring region.

BRIEF DESCRIPTION OF THE DRAWINGS

The invention will be further described with reference to the accompanying drawings, in which.

DETAILED DESCRIPTION OF THE INVENTION

Figure 1:
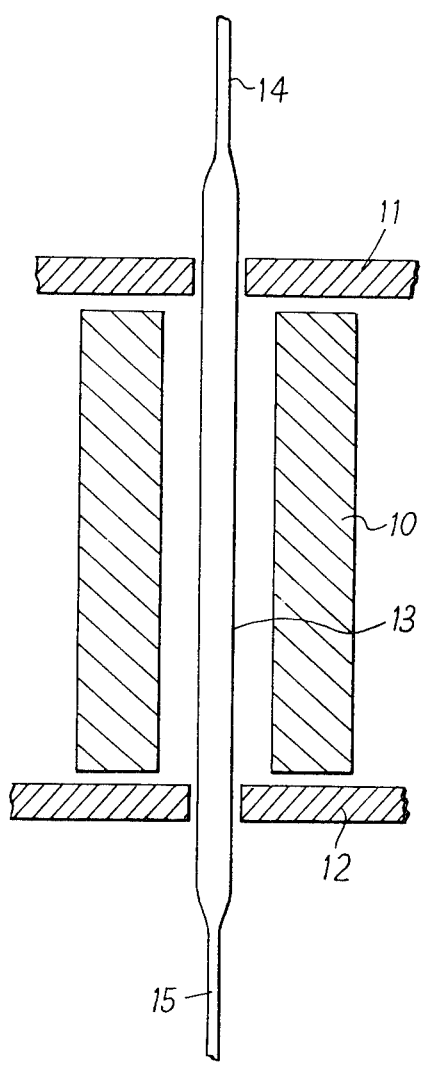
FIG. 1 is a section through a radiation measuring device.
Figure 2:
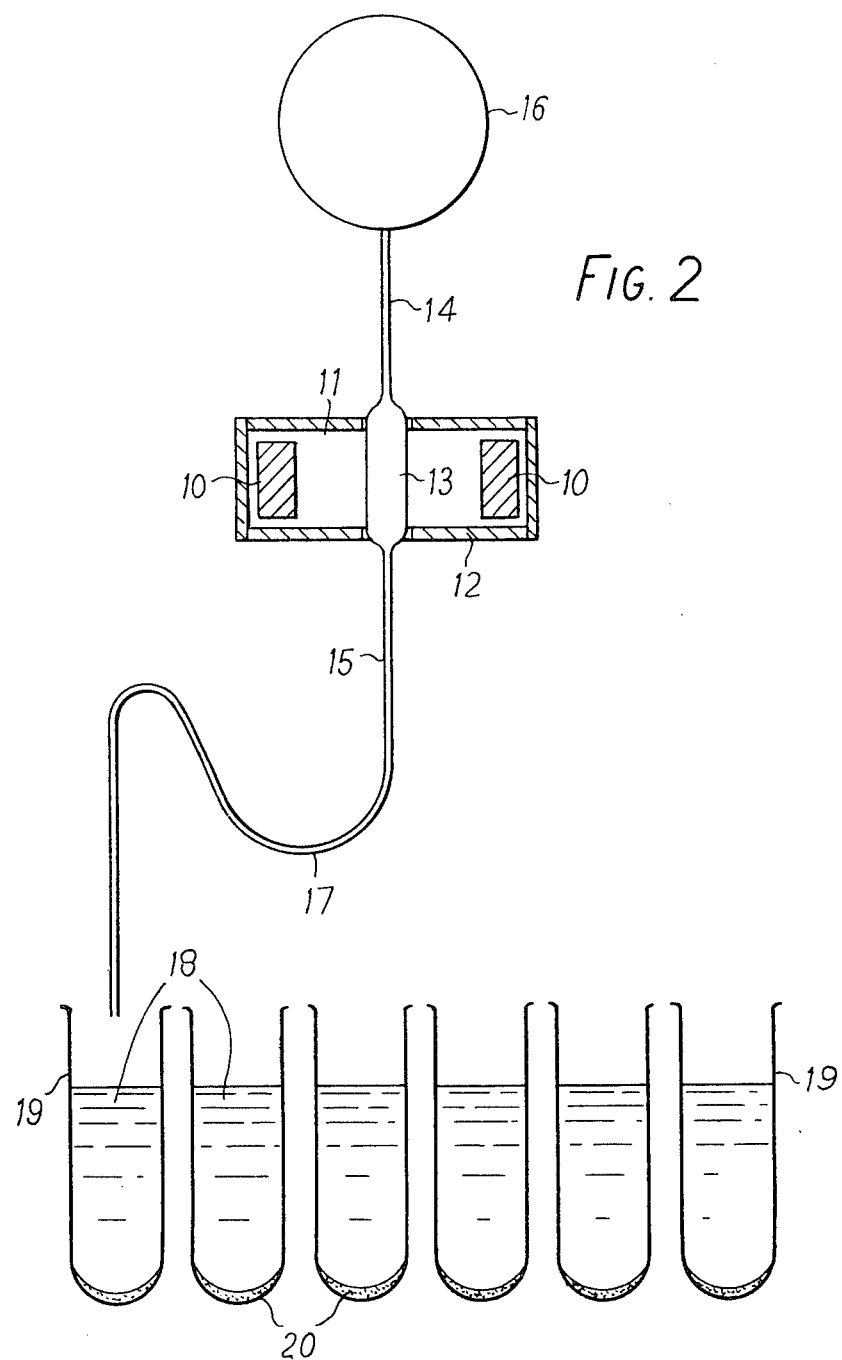
FIG. 2 is a diagrammatic view of the apparatus including the radiation measuring device.

Referring to the drawings, the measuring device comprises a sodium iodide scintillation crystal 10 which may conveniently be a single block of material with a cylindrical hole, in contact with a photmultiplier tube (not shown), and having lead shielding 11 and 12 positioned immediately above and below it. Extending through the hole of the sodium iodide scintillation crystal 10, and through holes in the lead shielding 11 and 12 is a tube 13 of a glass or plastics material, having a narrow bore 14 at its upper end and a narrow bore 15 at the lower end.

In use, the narrow bore 14 is connected to a pump 16 capable of applying a pressure either above or below atmospheric. The narrow bore 15 is connected to a flexible tube 17 of narrow internal diameter. The free end of this flexible tube 17 is dipped into a liquid phase 18 of material in an assay tube 19 in which a radiactive element or compound is partitioned between two phases, 18 and 20. The pump 16 is then operated to draw the liquid 18 up and through the tube 13 so the surface of the liquid is above the level of the lead shielding 11. The measuring device is then operated to determine the radioactive concentration of the liquid in a defined measuring region which is the tube 13 between the upper lead shielding 11 and the lower lead shielding 12.

During the measuring operation, the surface of the liquid must remain above the level of the lead shielding 11. During the measuring operation the free end of the flexible tube 17 may, but need not, remain immersed in the liquid phase 18.

After measuring is finished, the pump 16 is operated to remove the liquid phase from the tube 13. This may be done, for example, by blowing it out into the assay tube 19 from which it was originally drawn, or into another vessel. It may then be necessary or desirable to wash the tube 13 and the associated narrow flexible tube 17, for example, by passing water or other cleaning fluid therethrough. The free end of the flexible tube can then be dipped into another liquid phase 18, and the whole operation repeated.

The method described above is well adapted for automatic operation. Accordingly, the present invention includes apparatus for comparing the radioactive concentration of a set of liquids, which apparatus comprises a device adapted to measure radiation emitted from a defined measuring region, such defined measuring region having an opening connected to a pump and another opening connected to an open-ended tube, the pump being arranged to alternately i. draw liquid through the open-ended tube so as to fill the defined measuring region, and
ii. expel liquid from the defined measuring region after the radiation emitted therefrom has been measured,
and means for dipping the open end of the open-ended tube successively into each of the set of liquids whose radioactive concentration are to be compared.

This apparatus is most likely to be used in analyses involving several vessels each containing a radioactive element or compound partitioned between two phases, at least one of which is liquid. Such analyses are conventionally performed automatically up to the stage of manually decanting liquid in order to determine the level of radioactivity. The apparatus of this invention may conveniently be used in conjunction with, or as an extention of, the instruments used for performing such analyses.

The shape of the defined measuring region may vary widely. Preferably, thte region is in the form of a widened-out portion of a tube, one end of which is connected to a pump and the other end of which is to be immersed in the liquid to be analysed. The widened-out portion of the tube may be elongated, as illustrated in the drawing or spherical or any other convenient shape. Generally the ends of the defined region will be defined by lead or other shielding closely surrounding the tube. In the drawing, the lead shielding surrounds the tube in two places where it is widened out. There is no reason however, why the shielding should not surround narrow-bore points of the tube, for example at 14 and 15 in the drawing. Alternatively, the defined measuring region may take the form of a coil or spiral of the tube which need not necessarily be widened out at any point.

The shielding employed (of lead and other material) may be disposed in a number of ways, e.g. as a permanent fixture in the radioactivity counting assembly, as a removeable shield, or affixed to the tube counting the radioactive solution.

There may be advantages in some circumstances in employing a tube of accurately constant bore (in that its position on the vertical axis need not be accurately fixed, providing that the liquid level remains sufficiently above the level of the lead shielding). There may also be advantages in having precision bore tubes so that results will not alter if a tube is replaced. However, it is envisaged that a tube would need to be replaced only at infrequent intervals. It should also be noted that the tube may be calibrated in the "passive" sense that standards are included in the conventional radioimmunoassay procedure, or in an "active" sense, in that it is conceivable that a set of measurements might require a knowledge of the radioactive concentration of solutions in terms of microcuries/milliliter. In such a case, a solution containing the radionuclide at a known radioactive concentration could be used to calibrate the counting volume.

The method and apparatus of this invention are of primary utility with radioactive elements which are gamma-ray emitters. Iodine-125 is the radionuclide most widely used in radioimmunoassay, and is a particularly favourable example in that its gamma- and X-radiation is reduced to an insignificant level by as little as 0.2mm thickness of lead. There are other suitable radioclides well known to those skilled in the art.

The means for counting the radioactive emissions, or otherwise measuring the radioactive concentration of liquid in the defined measuring region may be conventional. Thus, well-type sodium iodide crystal scintillation counters of known type are suitable. Sealed ionisation chambers may be used if sufficient activity is available. Naturally, accurate collimation and screening of the counters are of particular importance in this invention, since liquid in the defined measuring region is always in contact with liquid outside this region, but the necessary collimation and screening can readily be achieved by known techniques.

As will be understood from the above description, the nature of the analysis of which measurement of radioactivity according to this invention forms a part, it is not material to the invention; immunoassays and similar competitive assays are suitable forms of analysis. The nature of the liquid is not material to the invention, nor, in the case where the radioactivity is partitioned between two phases, are the nature of the two phases material.

I claim:

1. In a method of performing a competitive radioassay by providing a set of vessels each containing a known or unknown amount of a compound to be assayed, introducing into each vessel a standard amount of a reagent which is labelled with a gamma-emitting radionuclide, and effecting chemical reaction within the vessel, whereby the labelled reagent is portioned between two phases including a liquid phase in proportions depending on the amount of the compound to be assayed that was originally present;

the improvement which comprises comparing the radioactive concentrations of the liquid phases in each of the set of vessels by
a. drawing an unmeasured liquid portion from one of the set of vessels into a measuring region defined by radiation shielding so that the liquid completely fills the said region;

b. measuring gamma-radiation emitted by the said liquid in the said region;

c. expelling the liquid from the said region, and repeating steps (a), (b) and (c) successively on the liquid phases in each of the set of vessels.

2. A method as claimed in claim 1, wherein the compound to be assayed is an antigen and the other reagent reactive therewith is the antibody of the antigen.

3. A method as claimed in claim 1, wherein the reacted and unreacted portions of the radioactively labelled reagent are separated into a liquid phase and a denser solid phase.

4. Apparatus for performing a competitive radioassay, said apparatus comprising:

a set of vessels each to contain a known or unknown amount of a compound to be assayed;

each of the said vessels containing a standard amount of a reagent which is labelled with a gamma-emitting radionuclide, thus effecting chemical reaction within the vessel, the reacted and unreacted portions of the radioactively labelled reagent being separated into two phases including a liquid phase;

means for comparing the radioactive concentrations of the said liquid phases in each of said vessels, said means comprising a measuring region defined by radiation shielding, the volume of said measuring region being less than the volume of the liquid phase in any of said vessels, a device adapted to measure gamma-radiation emitted from said measuring region, said defined measuring region having an opening connected to a pump and another opening connected to an open-ended tube which is selectively connectable to one of said vessels, said pump comprising means to alternately i. draw an unmeasured liquid portion through said open-ended tube so as to completely fill said defined measuring region, and ii. expel liquid from said defined measuring region after the radiation emitted therefrom has been measured; and means for dipping the open end of the said open-ended tube successively into the said liquid phases in each of the vessels.

5. Apparatus as claimed in claim 4, wherein the defined measuring region is in the form of a widened-out portion of the said open-ended tube, one end of which is connected to said pump and the other end of which is successively positioned into the liquid phases in each of the set of vessels.

6. In a method of performing a competitive radioassay by providing a set of vessels each containing a known or unknown amount of a compound to be assayed, introducing into each vessel a standard amount of a reagent which is labelled with a gamma-emitting radionuclide, and effecting chemical reaction within the vessel, whereby the labelled reagent is portioned between two phases including a liquid phase in proportions depending on the amount of the compound to be assayed that was originally present;

the improvement which comprises comparing the radioactive concentration of the liquid phases in each of the set of vessels by a. providing a conduit with a first end connected to a pump and a second end;

b. defining a limited measuring region in a portion of said conduit intermediate said first and second ends thereof by radioactively isolating said portion by means of radiation shielding;

c. placing said second end of said conduit in communication with the liquid in one of the set of vessels, and operating said pump to draw said liquid into said conduit to an arbitrary position between said measuring region and said first end of said conduit, thereby completely filling said measuring region with said liquid;

d. measuring gamma-radiation emitted by said liquid only in said radioactively isolated measuring portion;

e. expelling the liquid from said measuring region, and repeating steps c) and d) successively on the liquid phases in each of the set of vessels.

7. A method as claimed in claim 6, wherein the compound to be assayed is an antigen and the other reagent reactive therewith is the antibody of the antigen.

8. A method as claimed in claim 6, wherein the reacted and unreacted portions of the radioactively labelled reagent are separated into a liquid phase and a denser solid phase.

9. Apparatus for performing a competitive radioassay, said apparatus comprising:

a set of vessels each to contain a known or unknown amount of a compound to be assayed;

each of the said vessels containing a standard amount of a reagent which is labelled with a gamma-emitting radionuclide, thus effecting chemical reaction within the vessel, the reacted and unreacted portions of the radioactively labelled reagent being separated into two phases including a liquid phase;

a conduit with a first end and a second end;

radiation shielding means for radioactively isolating a portion of said conduit intermediate said first and second ends thereof, said portion comprising a measuring region, said measuring region having a volume less than the volume of the liquid phase in any of said vessels;

means positioned adjacent said measuring region for measuring gamma-radiation emitted by a liquid in said measuring region only; and pump means connected to said first end of said conoduit for alternately i. drawing liquid from one of the set of vessels through said second end of said conduit to an arbitrary position between said measuring region and said first end of said conduit, thus completely filling said measuring region with said liquid, and ii. expelling liquid from said measuring region after the radiation emitted therefrom has been measured.

10. An apparatus as claimed in claim 9, wherein said measuring region comprises a portion of said conduit having a larger diameter than the remainder thereof.

* * * * *